US009591720B2

(12) United States Patent
Asamura et al.

(10) Patent No.: US 9,591,720 B2
(45) Date of Patent: Mar. 7, 2017

(54) LED DISPLAY APPARATUS

(71) Applicant: Mitsubishi Electric Corporation, Tokyo (JP)

(72) Inventors: Yoshinori Asamura, Tokyo (JP); Shigenori Shibue, Tokyo (JP); Isao Yoneoka, Tokyo (JP); Yasunori Wada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/204,835

(22) Filed: Jul. 7, 2016

(65) Prior Publication Data

US 2017/0042002 A1 Feb. 9, 2017

(30) Foreign Application Priority Data

Aug. 5, 2015 (JP) ................................ 2015-154705
Aug. 5, 2015 (JP) ................................ 2015-154710
Aug. 5, 2015 (JP) ................................ 2015-154712

(51) Int. Cl.
*G06F 5/00* (2006.01)
*H05B 37/02* (2006.01)
*H05B 33/08* (2006.01)

(52) U.S. Cl.
CPC ..... *H05B 37/0227* (2013.01); *H05B 33/0815* (2013.01); *H05B 33/0851* (2013.01); *H05B 33/0866* (2013.01); *H05B 37/0281* (2013.01)

(58) Field of Classification Search
CPC ......... G09G 2300/0842; G09G 3/3233; G09G 2320/043; G09G 2300/0861; G09G 2300/0819; G09G 3/3688; G09G 3/3648; G09G 2330/021; G09G 2310/027; G09G 5/006; G09G 2300/0426; G09G 2300/0809
USPC .......................................... 345/204, 76, 205
See application file for complete search history.

(56) References Cited

U.S. PATENT DOCUMENTS

2010/0117998 A1* 5/2010 Yamashita ........... G09G 3/3233 345/204
2015/0116376 A1* 4/2015 Kimura ................ G09G 3/3406 345/690

FOREIGN PATENT DOCUMENTS

JP 11-15437 A 1/1999
JP 2006-330158 A 12/2006

* cited by examiner

*Primary Examiner* — Minh D A
(74) *Attorney, Agent, or Firm* — Birch, Stewart, Kolasch & Birch, LLP

(57) ABSTRACT

An LED display apparatus includes a first LED display including a first LED, a second LED display including a second LED, and a luminance corrector. The luminance corrector corrects a luminance of the first LED in accordance with a first cumulative lighting period of the first LED and with both luminance transitions and a second cumulative lighting period of the second LED.

11 Claims, 7 Drawing Sheets

F I G. 5
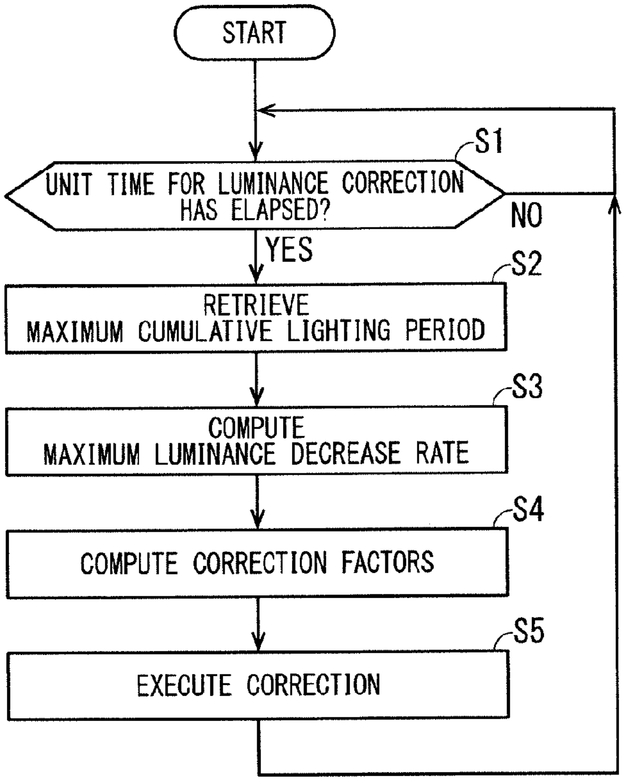
F I G. 6A
F I G. 6B
F I G. 6C
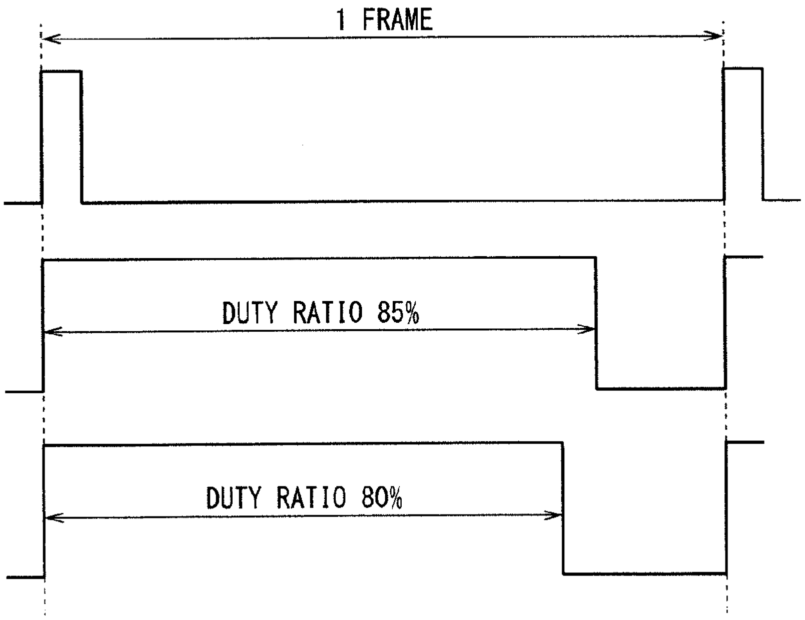

LED DISPLAY APPARATUS

FIELD OF THE INVENTION

The present invention relates to a light emitting diode (LED) display apparatus including an LED display that includes LEDs.

DESCRIPTION OF THE BACKGROUND ART

LED display apparatuses including LEDs are widely used to display, for example, advertisements indoors and outdoors owing to technical development associated with LEDs and reduction in cost of LEDs. In particular, the LED display apparatuses have been mainly used to display moving images such as natural pictures and animations. In recent years, the LED display apparatuses have reduced pixel pitches to keep the display quality at shorter visual distances, and thus are also available for indoor use, for example, for use in meeting rooms and for monitoring.

The LED display apparatuses for use in monitoring often display images similar to still images on personal computers. The luminances of the individual LEDs decrease with increasing lighting period. Thus, depending on contents of images, the lighting periods of the individual LEDs are varied and the luminance decrease rates of the individual LEDs are varied accordingly. Consequently, the pixel-to-pixel variations in luminance and color occur over the lighting period.

The following methods have been proposed to reduce such variations in luminance and color. According to one method (see, for example, Japanese Patent Application Laid-Open No. 11-015437 (1999)), the luminance of the LED display is detected, and then the luminance is corrected. According to another method (see, for example, Japanese Patent Application Laid-Open No. 2006-330158), the display periods of the individual LEDs are accumulated, and then a luminance correction factor is corrected in accordance with the accumulated period obtained by the calculation, so that the luminance is corrected.

Variations in luminance and color caused by differences in lighting periods of LEDs can be corrected by measuring luminance decrease rate of the LEDs in accordance with the accumulated period in life tests and by correcting the luminance using the luminance decrease rate. However, different LEDs inevitably have different characteristics that are difficult to predict, such as characteristics that vary from production lot to production lot. It has been therefore difficult to accurately correct variations in luminance merely in accordance with the accumulated period.

Meanwhile, the luminance can be accurately corrected by detecting the luminance from the LED display that displays a desired image. However, this technique necessitates the displaying of an image for measuring luminance. Thus, it has been necessary to halt the displaying (operation) to be performed by a 24-hour operation display system (such as a display system for use in monitoring as mentioned above) in order to correct, for example, variations in luminance, or it has been necessary to give up the correction of variations in luminance and the like in order to keep the displaying of the desired image.

SUMMARY OF THE INVENTION

The present invention therefore has been made to solve the above-mentioned problems and an object thereof is to provide a technique capable of eliminating or reducing variations in luminance and color of a first LED display while a desired image is kept displayed on the first LED display.

The present invention, which is an LED display apparatus, includes a first LED display, a second LED display, a lighting period storage, a luminance meter, a luminance transition storage, and a luminance corrector. The first LED display includes a first LED. The second LED display includes a second LED that undergoes luminance transitions equivalent to luminance transitions of the first LED. The lighting period storage stores a first cumulative lighting period of the first LED. The luminance meter measures a luminance of the second LED. The luminance transition storage correlates and stores the luminance transitions of the second LED measured by the luminance meter and a second cumulative lighting period of the second LED. The luminance corrector corrects a luminance of the first LED in accordance with the first cumulative lighting period stored in the lighting period storage and with the luminance transitions and the second cumulative lighting period of the second LED both stored in the luminance transition storage.

The variations in the luminance and color of the first LED display can be eliminated or reduced while a desired image is kept displayed on the first LED display.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a flowchart illustrating the operation of the LED display apparatus according to the first preferred embodiment;

FIGS. 6A, 6B, and 6C illustrate an example of PWM driving;

DESCRIPTION OF THE PREFERRED EMBODIMENTS

First Preferred Embodiment

Figure 1A:
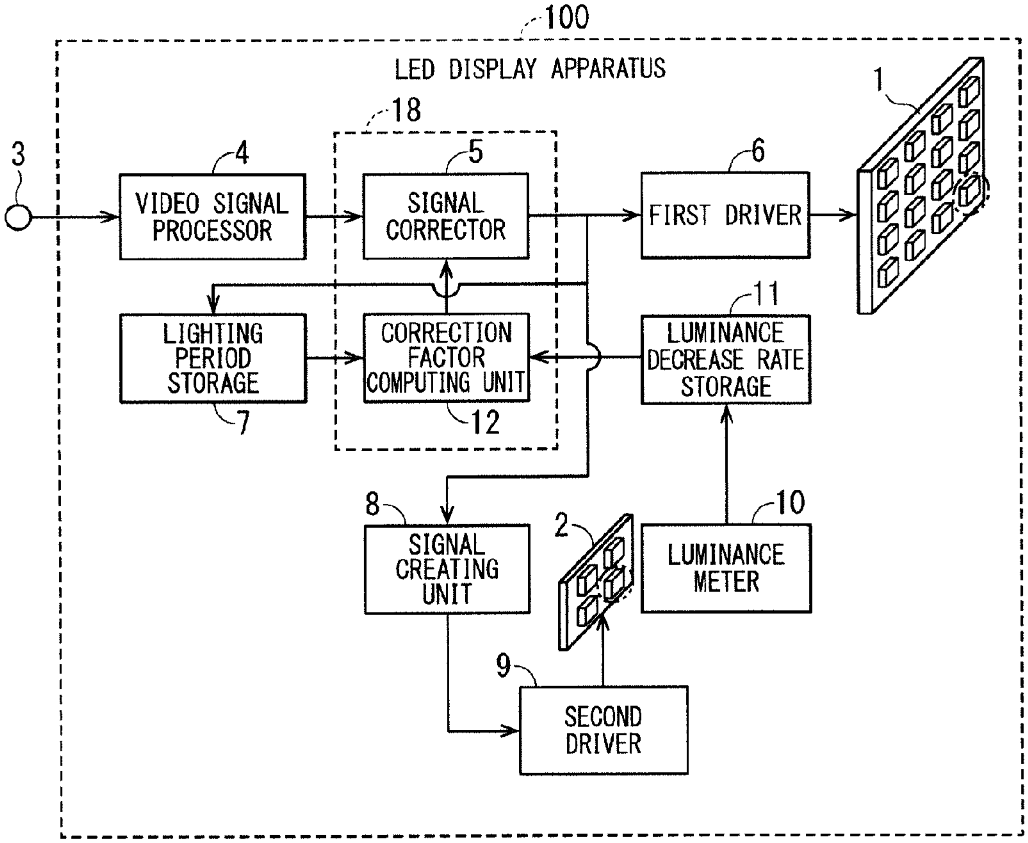
FIGS. 1A and 1B are block diagrams illustrating a configuration of an LED display apparatus according to a first preferred embodiment.
Figure 1B:
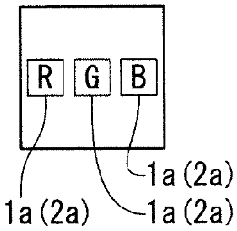

FIGS. 1A and 1B are block diagrams illustrating a configuration of an LED display apparatus according to a first preferred embodiment of the present invention. An LED display apparatus 100 in FIG. 1A includes a first LED display 1, a second LED display 2, an input terminal 3, a video signal processor 4, a signal corrector 5, a first driver 6, a lighting period storage 7, a signal creating unit 8, a second driver 9, a luminance meter 10, a luminance decrease rate storage 11, namely, a luminance transition storage, and a correction factor computing unit 12. The signal corrector 5 and the correction factor computing unit 12 are included in a luminance corrector 18.

Figure 2:
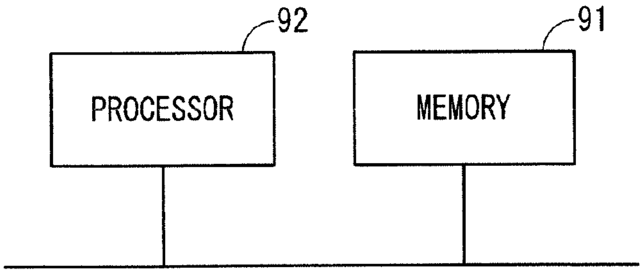
FIG. 2 is a block diagram illustrating a hardware configuration of the LED display apparatus according to the first preferred embodiment.

Firstly, the following describes a hardware of the individual constituent component. The first LED display 1 and the second LED display 2 are, for example, LED display panels. The luminance meter 10 is, for example, a measuring device, such as a photodiode capable of performing a measurement with light of wavelengths in the visible range. Each of the lighting period storage 7 and the luminance decrease rate storage 11 is, for example, a memory 91 in FIG. 2. The video signal processor 4, the signal corrector 5, the first driver 6, the signal creating unit 8, the second driver 9, and the correction factor computing unit 12 (hereinafter referred to as a "configuration including the video signal processor 4") is actualized by, for example, a processor 92 in FIG. 2 executing programs stored in the memory 91.

The memory 91 includes a non-volatile or volatile semiconductor memory, such as a random-access memory (RAM), a read-only memory (ROM), a flash memory, an erasable programmable read-only memory (EPROM), or an electrically erasable programmable read-only memory (EEPROM), a magnetic disk, a flexible disk, an optical disk, a compact disk, a minidisk, and a digital versatile disk (DVD). The processor 92 includes a central processing unit (CPU), a processing unit, an arithmetic unit, a microprocessor, a microcomputer, a processor, and a digital signal processor (DSP). The above-mentioned programs cause the computer to execute procedures and methods associated with the configuration including the video signal processor 4. These programs are implemented by software, firmware, or a combination of the software and the firmware.

It is not always required that the configuration including the video signal processor 4 be actualized by the operation performed in accordance with software programs. For example, the configuration may be actualized by signal processing circuitry in which the operation is performed by electric circuits of the hardware. Alternatively, the configuration including the video signal processor 4 may be a combination of a configuration actualized by the software programs and a configuration actualized by the hardware.

Next, the following describes an outline of the individual constituent components of the LED display apparatus 100 in FIGS. 1A and 1B. Then, some of the constituent components will be described in detail.

<Outline>

The first LED display 1 is used to display desired images, such as characters and figures. The first LED display 1 includes a plurality of first LEDs 1*a* and is driven in accordance with a first drive signal (in other words, a display pattern, a drive pattern, and drive data) from the first driver 6, so that the flashing of the individual first LED 1*a* is controlled.

The individual first LED 1*a* is an LED in red (R), an LED in green (G), or an LED in blue (B). The plurality of first LEDs 1*a* included in the first LED display 1 are composed of LEDs in R, LEDs G, and LEDs in B. In an example illustrated in FIG. 1A, a four by four array of sets of the first LEDs 1*a*, or equivalently, sixteen sets of the first LEDs 1*a* in total are arranged in matrix. As illustrated in FIG. 1B, each set of the first LEDs 1*a* includes three LEDs, namely, an LED in R, an LED in G, and an LED B. The number of the first LEDs 1*a* is not limited to three.

The second LED display 2 performs display to measure (predict) luminance transitions of the first LED display 1. For example, the luminance transitions refer to the luminance maintenance rate representing the current luminance, with 100% indicating the initial luminance, or refer to the luminance decrease rate (=100%−luminance maintenance rate) being the reverse of the luminance maintenance rate. The following description will be given assuming that the luminance transitions refer to the luminance decrease rate.

The second LED display 2 includes a plurality of second LEDs 2*a* and is driven in accordance with a second drive signal (in other words, a display pattern, a drive pattern, and drive data) from the second driver 9, so the flashing of the individual second LEDs 2*a* is controlled.

The second LEDs 2*a* have a luminance decrease rate equivalent to the luminance decrease rate of the first LEDs 1*a*. This means that the luminance decrease rate of the second LEDs 2*a* is equal to the luminance decrease rate of the first LEDs 1*a* or is close enough to be equated to the luminance decrease rate of the first LED 1*a*. If the first LEDs 1*a* and the second LEDs 2*a* are LEDs of the same production lot or they have the same BIN code for classifying LEDs in accordance with, for example, luminance and wavelength, the characteristics of the first LEDs 1*a* such as the luminance and the wavelength agree with the characteristics of the second LEDs 2*a*. Consequently, the luminance decrease rate of the first LEDs 1*a* and the luminance decrease rate of the second LEDs 2*a* become equivalent.

Similarly to the individual first LED 1*a*, the individual second LED 2*a* is an LED in R, an LED G, or an LED B. The plurality of second LEDs 2*a* included in the second LED display 2 are composed of LEDs in R, LEDs in G, and LEDs in B. In the example illustrated in FIG. 1A, a two by two array of sets of the second LEDs 2*a*, or equivalently, four sets of the second LEDs 2*a* in total are arranged in matrix. Similarly to each set of the first LEDs 1*a*, each set of the second LEDs 2*a* includes three LEDs, namely, an LED in R, an LED in G, and an LED in B. The number of the second LEDs 2*a* is not limited to three.

In the first preferred embodiment, the first LED display 1 and the second LED display 2 concurrently perform display (driving). Thus, the first LEDs 1*a* and the second LEDs 2*a* flash in similar environments, so that the difference in the luminance decrease rate between the first LEDs 1*a* and the second LEDs 2*a* can be reduced.

The input terminal 3 receives a video signal from the outside. In accordance with the video signal received by the input terminal 3, the video signal processor 4 selects a region necessary to perform display and performs processing including the gamma correction.

The signal corrector 5 corrects the luminance of the signal output from the video signal processor 4 using correction factors received from the correction factor computing unit 12, which will be described below. Thus, the signal corrector 5 can virtually correct the first drive signal which is to be transmitted from the first driver 6 to the first LED display 1 and can virtually correct the luminance of at least one first LED 1*a* accordingly.

The first driver 6 creates, in accordance with the output signal corrected by the signal corrector 5, a first drive signal for driving the first LED display 1. The first driver 6 outputs the first drive signal to the first LED display 1, so that the first LED display 1 is driven.

The lighting period storage 7 stores a first cumulative lighting period of the first LEDs 1*a* (a period being the cumulative sum of the lighting periods of the first LEDs 1*a*).

The signal creating unit 8 creates, in accordance with the output signal corrected by the signal corrector 5, a signal for creating a second drive signal for driving the second LED display 2.

The second driver 9 creates, in accordance with the signal created by the signal creating unit 8, a second drive signal for driving the second LED display 2. The second driver 9 outputs the second drive signal to the second LED display 2, so that the second LED display 2 is driven.

The luminance meter 10 measures the luminances of the second LEDs 2*a* included in the second LED display 2.

The luminance decrease rate storage 11, namely, the luminance transition storage correlates and stores the luminance decrease rate of the second LEDs 2*a* measured by the luminance meter 10 and a second cumulative lighting period of the second LEDs 2*a* (a period being the cumulative sum of the lighting periods of the second LEDs 2*a*). The luminance meter 10 performs measurement and the luminance decrease rate storage 11 performs storing as the need arises while the second LED display 2 performs display.

The correction factor computing unit 12 computes luminance correction factors in accordance with the first cumulative lighting period stored in the lighting period storage 7 and with the luminance decrease rate and the second cumulative lighting period of the second LEDs 2*a* both stored in the luminance decrease rate storage 11.

The signal corrector 5 and the correction factor computing unit 12 mentioned above are included in the luminance corrector 18 in FIG. 1A. This means that the luminance corrector 18 computes the above-mentioned correction factors in accordance with the first cumulative lighting period stored in the lighting period storage 7 and with the luminance decrease rate and the second cumulative lighting period of the second LEDs 2*a* both stored in the luminance decrease rate storage 11. The luminance corrector 18 corrects the luminance of the signal output from the video signal processor 4 using the correction factors, and thus corrects the first drive signal (drive signal) to be output from the first driver 6 and corrects the luminances of the first LEDs 1*a* accordingly.

In the first preferred embodiment, the individual first LEDs 1*a* have different first cumulative lighting periods. The luminance corrector 18 is configured to correct the luminances of the first LEDs in accordance with the longest first cumulative lighting period among the first cumulative lighting periods stored in the lighting period storage 7 and with the luminance decrease rate and the second cumulative lighting period of the second LEDs 2*a* both stored in the luminance decrease rate storage 11.

<Details>

In the first preferred embodiment, the output signal corrected by the signal corrector 5 includes information on the duty ratio of the first drive signal to be output from the first driver 6. The lighting period storage 7 accumulates the lighting periods of the individual first LEDs 1*a* per fixed unit time in accordance with the duty ratio included in the output signal, and stores the first cumulative lighting period of the individual first LEDs 1*a* accordingly. Assuming that the unit time is one hour and the duty ratio is 10%, 0.1 hour of lighting period (the period obtained by deducting the lights-out period from the flashing period) is added to the first cumulative lighting period in the lighting period storage 7 once every hour.

Figure 3:
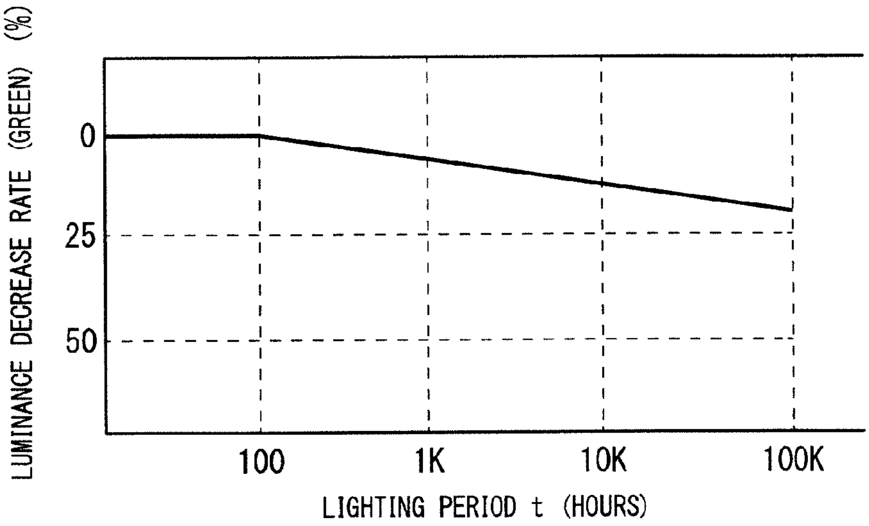
FIG. 3 is a graph illustrating an example of the relation between the lighting period and the luminance decrease rate of first LED.

FIG. 3 is a graph illustrating an example of the relation between the luminance decrease rate and the lighting period (the first cumulative lighting period) of the first LED 1*a* in green (G). A logarithmic scale is used to indicate the lighting period in FIG. 3.

As illustrated in FIG. 3, the luminance decrease rate of the first LED in green (G) increases with increasing lighting period, and the luminance of the first LED 1*a* in green (G) declines accordingly. Similarly, the luminance of the first LED 1*a* in red (R) and the luminance of the first LED in blue (B), to one degree or another, decrease with increasing lighting period (not shown). The luminances of the second LEDs 2*a* also decrease with increasing lighting period as will be described below.

According to the related art, the luminance decrease rate of the first LED 1*a* is determined by measuring the actual luminance in advance. In the first preferred embodiment, meanwhile, the first lighting period is measured in place of the actual luminance of the first LED 1*a*, and then the luminance decrease rate of the second LED 2*a* corresponding to the second lighting period which is substantially the same as the first lighting period is measured (predicted) as the luminance decrease rate of the first LED 1*a*. The measurement of (prediction on) the luminance decrease rate of the first LED 1*a* will be described below.

The signal creating unit 8 creates, in accordance with the output signal corrected by the signal corrector 5, a signal which is to become the second drive signal for controlling display performed by the second LED display 2. The second driver 9 drives the second LED display 2 in accordance with the signal created by the signal creating unit 8.

The signal creating unit 8 reads, from the output signal corrected by the signal corrector 5, the maximum duty ratio of the first drive signal (such as a pulse width modulation (PWM) signal) for driving the first LED display 1 and creates a signal for driving the second LED display 2 at the maximum duty ratio. Assuming that 100% indicates the maximum duty ratio of the first drive signal for driving the first LED display 1, the duty ratio of the second drive signal for driving the second LED display 2 is set at 100%.

Consequently, the second cumulative lighting period of the second LEDs 2*a* is set to be equal to the longest first cumulative lighting period among the first cumulative lighting periods of the plurality of first LEDs 1*a* included in the first LED display 1 in the first preferred embodiment. This means that the second cumulative lighting period of the second LEDs 2*a* is controlled to be equal to or longer than the first cumulative lighting period of the first LEDs 1*a*. The second cumulative lighting periods of the second LEDs 2*a* in RGB colors may be controlled per color.

The luminance meter 10 is opposed to the second LED display 2 and measures the luminances of the second LEDs 2*a*. In the first preferred embodiment, the luminance meter 10 measures the luminance of each color of the second LEDs 2*a*.

Figure 4:
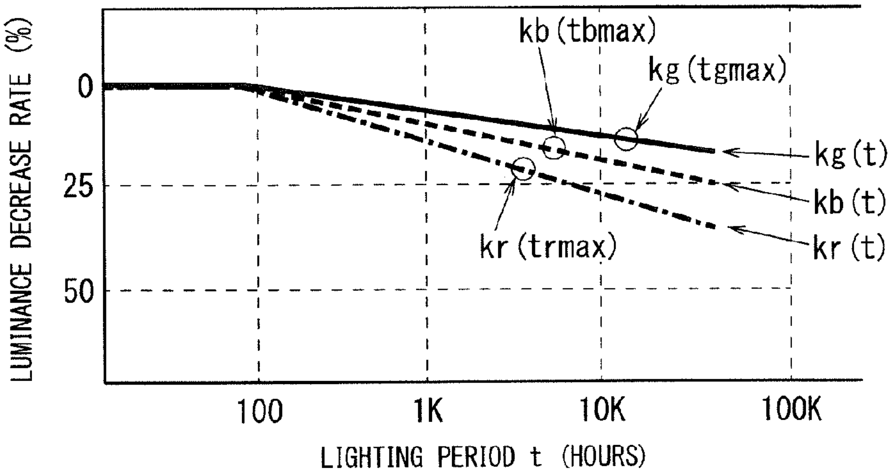
FIG. 4 is a graph illustrating an example of the relation between the lighting period and the luminance decrease rates of second LEDs.

FIG. 4 is a graph illustrating an example of the relation between the luminance decrease rates of the second LEDs 2*a* in RGB colors and the lighting period (the second cumulative lighting period) being the elapsed time. A logarithmic scale is used to indicate the lighting period in FIG. 4.

As illustrated in FIG. 4, similarly to the luminances of the first LEDs 1, the luminances of the second LEDs 2*a* decrease with increasing lighting period. The luminance decrease rates of the second LEDs 2*a* in RGB colors are represented by kr(t), kg(t), and kb(t), which are factors of a lighting period t. These factors kr(t), kg(t), and kb(t) can be computed as relational expressions such as approximation formulas or interpolation formulas by, for example, regression analysis of the luminance decrease rates and the second cumulative lighting periods of the plurality of sets of the second LEDs 2*a* both stored in the luminance decrease rate storage 11.

The luminance decrease rate storage 11 correlates and stores the measurement results obtained by the luminance meter 10 and the lighting periods of the second LEDs 2*a*. Then, the luminance corrector 18 reads the luminance (luminance decrease rate) corresponding to the lighting period of the second LED 2*a* that is equal to or close to the lighting period (actual measurement time) of the first LEDs 1*a* stored in the lighting period storage 7. Thus, in the first preferred embodiment, the luminance decrease rate of the first LEDs 1*a* can be virtually measured without necessitating the actual measurement of the luminances of the first LEDs 1*a*.

<Operation>

FIG. 5 is a flowchart illustrating the luminance correction operation performed by the LED display apparatus 100 according to the first preferred embodiment.

Firstly, in Step S1, the luminance corrector 18 (the signal corrector 5 and the correction factor computing unit 12) determines whether the unit time (for example, 100 hours) for the luminance correction has elapsed since the operation was started or since the previous correction was performed. The unit time for the luminance correction may be fixed or may be varied depending on the number of corrections (may be represented by an exponential function of the number of corrections). If the luminance corrector 18 determines that the unit time for the luminance correction has elapsed, the processing proceeds to Step S2. If not, the Step S1 is executed again.

In Step S2, the luminance corrector 18 makes reference to the lighting period storage 7 to retrieve maximum cumulative lighting periods trmax, tgmax, and tbmax of the first LEDs 1*a* in RGB colors.

In Step S3, the luminance corrector 18 acquires, from the luminance decrease rate storage 11, the luminance decrease rates of RGB colors corresponding to the second cumulative lighting periods equal to or close to the maximum cumulative lighting periods trmax, tgmax, and tbmax retrieved in Step S2. The acquired luminance decrease rates of RGB colors are substantially the same as kr(trmax), kg(tgmax), and kb(tbmax) obtained by substituting trmax, tgmax, and tbmax into t included in the above-mentioned luminance decrease rate factors kr(t), kg(t) and kb(t). For the sake of convenience, the luminance decrease rates of RGB colors acquired in Step S3 are hereinafter also represented by the luminance decrease rates kr(trmax), kg(tgmax), and kb(tbmax).

The luminance corrector 18 computes, as a maximum luminance decrease rate krgb(tmax), the greatest luminance decrease rate among the luminance decrease rates kr(trmax), kg(tgmax), and kb(tbmax). This means that the luminance corrector 18 computes the maximum luminance decrease rate krgb(tmax) given by Expression (1) as below.

$$krgb(t\mathrm{max}) = \mathrm{MAX}(kr(tr\mathrm{max}), kg(tg\mathrm{max}), kb(tb\mathrm{max})) \quad (1)$$

In Step S4, the luminance corrector 18 makes reference to the lighting period storage 7 and the luminance decrease rate storage 11 and computes a correction factor for each of the first LEDs 1*a* included in the first LED display 1 in accordance with the theoretical luminance decrease rate corresponding to the cumulative lighting period t and with the maximum luminance decrease rate krgb(tmax) computed in Step S3.

Corrected luminances Rcomp, Gcomp, Bcomp of the first LEDs 1*a* in RGB colors are given by Expression (2) as below, with the current theoretical luminances of the first LEDs 1*a* in RGB colors being denoted by Rp, Gp, and Bp, the theoretical luminance decrease rates of the first LEDs 1*a* in RGB colors corresponding to the cumulative lighting period t being represented by kr(t), kg(t), and kb(t), and the maximum luminance decrease rate being represented by krgb(tmax). The luminance decrease rates kr(t), kg(t), and kb(t) of RGB colors corresponding to the cumulative lighting period t are, for example, the maximum luminance decrease rates computed in the previous correction.

$$\left.\begin{aligned} Rcomp &= Rp \times \frac{1}{(1-kr(t))} \times (1-krgb(t\mathrm{max})) \\ Gcomp &= Gp \times \frac{1}{(1-kg(t))} \times (1-krgb(t\mathrm{max})) \\ Bcomp &= Bp \times \frac{1}{(1-kb(t))} \times (1-krgb(t\mathrm{max})) \end{aligned}\right\} \quad (2)$$

The luminance corrector 18 in the first preferred embodiment uses, as expressions representing the correction factors to be obtained in Step S4, expressions obtained by substituting 1 into Rp, Gp, and Bp on the right side of Expression (2).

The current theoretical luminances Rp, Gp, and Bp in Expression (2) are given by Expression (3) as below, with the initial luminances of the first LEDs 1*a* in RGB colors being denoted by R0, G0, and B0.

$$\left.\begin{aligned} Rp &= R0 \times (1-kr(t)) \\ Gp &= G0 \times (1-kg(t)) \\ Bp &= B0 \times (1-kb(t)) \end{aligned}\right\} \quad (3)$$

Substituting Expression (3) into Expression (2) yields Expression (4) representing the corrected luminances Rcomp, Gcomp, and Bcomp of the first LEDs 1*a* in RGB colors. As given by Expression (4), the luminances Rcomp, Gcomp, and Bcomp are obtained by correcting the initial luminances R0, G0, and B0 of the first LEDs 1*a* in RGB colors uniformly with the maximum luminance decrease rate krgb(tmax).

$$\left.\begin{aligned} Rcomp &= R0 \times (1-krgb(t\mathrm{max})) \\ Gcomp &= G0 \times (1-krgb(t\mathrm{max})) \\ Bcomp &= B0 \times (1-krgb(t\mathrm{max})) \end{aligned}\right\} \quad (4)$$

Subsequent to Step S4, the luminance corrector 18 corrects, in Step S5, the luminance of the signal output from the video signal processor 4, or equivalently, virtually corrects the first drive signal using the correction factors computed in Step S4, so that the luminances of the first LEDs 1*a* are corrected. Then, the processing returns to Step S1.

The luminances of the first LEDs 1*a* are adjusted in accordance with, for example, the pulse width modulation (PWM) method. FIGS. 6A, 6B, and 6C illustrate an example of the PWM driving according to the PWM method. FIG. 6A illustrates a basic cycle (pulse cycle) of the PWM, which is set to be shorter than one frame period of a video signal. FIG. 6B is given assuming that the duty ratio of the pulse width is, for example, 85%. FIG. 6C is given assuming that the duty ratio of the pulse width is, for example, 80%. The pulse cycle is so short that the human eyes perceive the LEDs staying on while the LEDs are flashing in the pulse cycle. According to the PWM method, the percentage of the lighting period of an LED decreases with decreasing duty ratio. Thus, the brightness perceived by the human eyes in FIG. 6C is lower than the perceived brightness in FIG. 6B. The luminances of the first LEDs 1*a* can be adjusted by changing the duty ratio of the pulse width.

Similarly to the luminance adjustment, the luminance correction is performed by changing the duty ratio of the pulse width in Step S5 mentioned above. If krgb (tmax)=0.2 and kr(t)=0.1, the expression representing the correction factor (the expression obtained by substituting 1 into Rp, Gp, or Bp on the right side of Expression (2) mentioned above) gives (1−0.2)/(1−0.1)=8/9 as the correction factor for the luminance Rp. The luminance corrector 18 multiplies the duty ratio of the pulse width by 8/9 to correct the luminances of the first LEDs 1*a*.

<Conclusion of First Preferred Embodiment>

In the LED display apparatus 100 according to the first preferred embodiment in which above-mentioned correction is performed, the luminances of all of the first LEDs 1*a* can be uniformly adjusted to be equal to the luminance of the LED having the longest lighting period (the luminance of the LED having the greatest luminance decrease rate) although the overall luminance of the first LED display 1 after the correction is lower than the overall luminance of the first LED display 1 before the correction. The luminance consistency and the white balance can be kept in the first LED display 1 as a whole, and variations in luminance and color can be eliminated or reduced accordingly.

In the first preferred embodiment, the second LED display 2 is driven at a duty ratio equivalent to the maximum duty ratio at which the first LED display 1 is driven. Consequently, the second cumulative lighting period of the second LEDs 2*a* is equal to or longer than the first cumulative lighting period of the first LEDs 1*a*, and thus the luminances of the second LEDs 2*a* decrease at a pace equal to or faster than the pace at which the luminances of the first LEDs 1*a* decrease. This means that the luminance decrease rate storage 11 stores the luminance decrease rate of the second LED 2*a* having the longest lighting period as the future luminance decrease rate of the first LEDs 1*a*. In the first preferred embodiment, the luminance decrease rate of the first LEDs 1*a* is predicted in accordance with the luminance decrease rate of the second LEDs 2*a* stored in the luminance decrease rate storage 11. Thus, the luminance decrease rate of the first LEDs 1*a* can be predicted with a higher degree of accuracy, and the luminance can be corrected with a higher degree of accuracy accordingly.

According to the related art, the luminance decrease rate of the first LED display 1 cannot be measured while a desired image is kept displayed on the first LED display 1. Thus, the related art fails to eliminate or reduce variations in luminance and color. According to the first preferred embodiment, meanwhile, with the desired image being kept displayed on the first LED display 1, the actual luminance decrease rate of the second LED display 2, which is not the first LED display 1, is measured, so that the luminance decrease rate of the first LED display 1 can be virtually measured. Consequently, variations in luminance and color can be eliminated or reduced. This is expected to reduce the need for replacement with a new LED module.

<Modification>

In the first preferred embodiment, the second LED display 2 includes a plurality of sets (a two by two array of sets, or equivalently, four sets in FIG. 1A) of the second LEDs 2*a*. It is not always required that the second LED display 2 include a plurality of sets of the second LEDs 2*a*. Alternatively, the second LED display 2 may include one set of the second LEDs 2*a*. Unlike the configuration including one set of the second LEDs 2*a*, the configuration including a plurality of sets of the second LEDs 2*a* can provide the mean value of luminance per color, thus eliminating or reducing the adverse effects attributable to variations in luminance.

In the first preferred embodiment, the luminance corrector 18 is configured to measure (predict) the luminance decrease rate of the first LED 1*a* by reading the luminance corresponding to the lighting period of the second LED 2*a* equal to or close to the lighting period (actual measurement time) of the first LED 1*a* stored in the lighting period storage 7.

Alternatively, the luminance corrector 18 may compute the luminance decrease rate factors kr(t), kg(t), and kb(t) by, for example, regression analysis of the luminance decrease rates and the second cumulative lighting periods of the plurality of sets of the second LEDs 2*a* both stored in the luminance decrease rate storage 11. Then, the luminance corrector 18 may measure (predict), as the luminance decrease rates of the first LEDs 1*a*, the luminance decrease rates kr(trmax), kg(tgmax), and tb(tbmax) obtained by substituting the maximum cumulative lighting periods trmax, tgmax, and tbmax of the first LEDs 1*a* into t included in the luminance decrease rate factors kr(t), kg(t), and kb(t).

This configuration allows predictions on the luminance decrease rate of the first LED 1*a* without the need for controlling the second cumulative lighting period of the second LED 2*a* to be equal to or longer than the first cumulative light period of the first LED 1*a*.

The above-mentioned modifications are also applicable to second, fifth, and sixth preferred embodiments, which will be described below.

Second Preferred Embodiment

An LED display apparatus according to the second preferred embodiment of the present invention has the same block configuration as that of the LED display apparatus according to the first preferred embodiment (see FIGS. 1A and 1B). The constituent components of the LED display apparatus according to the second preferred embodiment that are identical to or similar to the constituent components of the LED display apparatus according to the first preferred embodiment are denoted by the same reference signs. The following description will be mainly given on the distinctive constituent components.

The LED display apparatus 100 according to the first preferred embodiment performs luminance correction in such a manner that the luminances of the individual first LEDs 1*a* included in the first LED display 1 are uniformly adjusted to be equal to the luminance of the first LED 1*a* having the greatest luminance decrease rate assuming that the initial luminances of the first LEDs 1*a* are set at the maximum luminance.

In the LED display apparatus 100 according to the second preferred embodiment, the initial luminances of the first LEDs 1*a* are set at a luminance lower than the maximum luminance of the first LEDs 1*a* (for example, a luminance equivalent to 50% of the maximum luminance). The luminance corrector 18 in this configuration can perform luminance correction in such a manner that the luminances of the individual first LEDs 1*a* included in the first LED display 1 are uniformly adjusted to be equal to the luminance of the first LED 1*a* having the smallest luminance decrease rate. Thus, the luminance corrector 18 can make the correction such that the luminances of the first LEDs 1*a* are adjusted to (maintained at) the fixed initial luminance.

To be more specific, the corrected luminances Rcomp, Gcomp, and Bcomp of the first LEDs 1*a* in RGB colors are given by Expression (5) as below, with the current theoretical luminances of the first LEDs 1*a* in RGB colors being denoted by Rp, Gp, and Bp and the theoretical luminance decrease rates of RGB colors corresponding to the cumulative lighting period t being represented by kr(t), kg(t), and kb(t).

$$\left.\begin{aligned} Rcomp &= Rp \times \frac{1}{(1 - kr(t))} \\ Gcomp &= Gp \times \frac{1}{(1 - kg(t))} \\ Bcomp &= Bp \times \frac{1}{(1 - kb(t))} \end{aligned}\right\} \quad (5)$$

Substituting Expression (3) into Expression (5) yields Expression (6) representing the corrected luminances Rcomp, Gcomp, and Bcomp of the first LEDs 1*a* in RGB colors. As given by Expression (6), the corrected luminances Rcomp, Gcomp, and Bcomp of the first LEDs 1*a* in RGB colors become equal to the initial luminances R0, G0, and B0 of the first LEDs 1*a* in RGB colors.

$$\left.\begin{aligned} Rcomp &= R0 \\ Gcomp &= G0 \\ Bcomp &= B0 \end{aligned}\right\} \quad (6)$$

<Conclusion of Second Preferred Embodiment>

Although the initial luminances are low, the second preferred embodiment has an advantage in the constant luminances before and after the correction. The luminances of the first LEDs 1*a* can be corrected by changing the duty ratio of the pulse width as in the first preferred embodiment. As described above, the luminances of the first LEDs 1*a* that have undergone the luminance decrease are corrected to be equal to the initial luminance, so that the luminances of all of the first LEDs 1*a* can be adjusted to be equal to the initial luminance. Even if the luminances of the first LEDs 1*a* decrease over time, the luminance of the first LED display 1 can be kept constant.

The above-mentioned control for keeping the luminances constant may be applied to the configuration capable of providing a multiscreen display through the use of a plurality of LED panels such that the luminances of the individual LED panels can be kept constant. The luminance of the multiscreen as a whole can be kept constant as in the above description accordingly.

As described above, the output from the video signal processor 4 undergoes the luminance correction for the first LEDs 1*a*. It is only required that the duty ratio of the first drive signal for the first LEDs 1*a*, the drive current, or the driving of the first LED display 1 be corrected in the processing, and thus the target of the luminance correction is not limited to the output from the video signal processor 4.

Third Preferred Embodiment

Figure 7A:
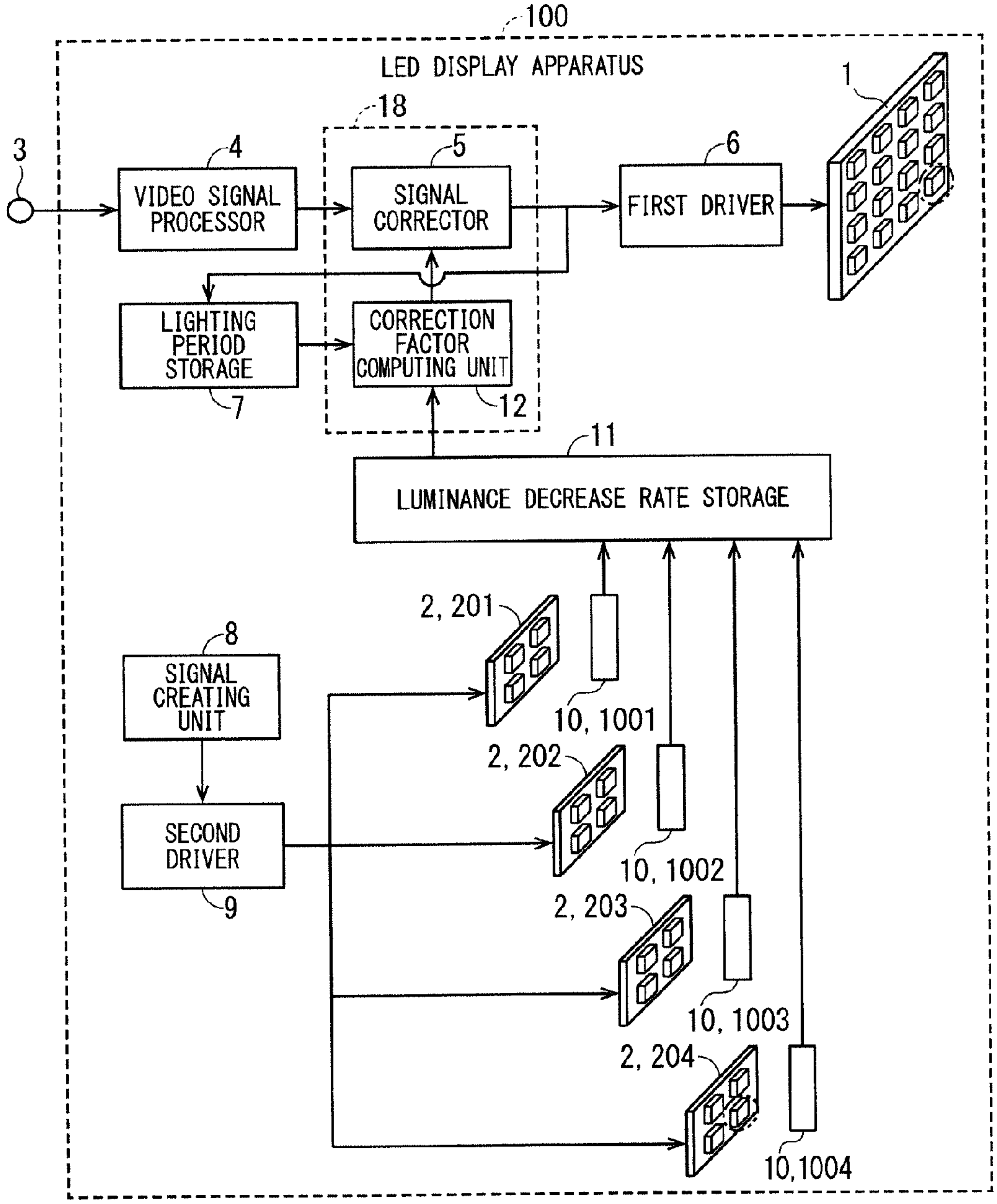
FIGS. 7A and 7B are block diagrams illustrating a configuration of an LED display apparatus according to a third preferred embodiment.
Figure 7B:
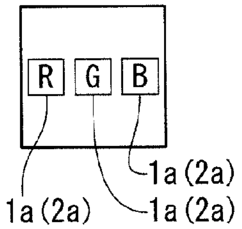

FIGS. 7A and 7B are block diagrams illustrating a configuration of an LED display apparatus according to a third preferred embodiment of the present invention. The constituent components of the LED display apparatus according to the third preferred embodiment that are identical to or similar to the LED display apparatus according to the first preferred embodiment are denoted by the same reference signs. The following description will be given on the distinctive constituent components. The LED display apparatus 100 illustrated in FIG. 7A includes a plurality of second LED displays 2 (second LED displays 201, 202, 203, and 204). The hardware of the individual constituent component is similar to the hardware in FIG. 2 described in the first preferred embodiment. The plurality of second LED displays 2 are, for example, LED display panels.

The outline of the individual constituent components of the LED display apparatus 100 in FIGS. 7A and 7B will be described, and then some of the constituent components will be described in detail.

<Outline>

The plurality of second LED displays 2 perform display to measure (predict) luminance transitions of the first LED display 1. For example, the luminance transitions refer to the luminance maintenance rate representing the current luminance, with 100% indicating the initial luminance or refer to the luminance decrease rate (=100%−luminance maintenance rate) being the reverse of the luminance maintenance rate. The following description will be given assuming that the luminance transitions refer to the luminance decrease rate.

The plurality of second LED displays 2 each include a plurality of second LEDs 2*a* and are driven in accordance with a plurality of second drive signals (in other words, display patterns, drive patterns, and drive data) from the second driver 9 that are different from one another, so that the flashing of the individual second LEDs 2*a* is controlled.

The second LEDs 2*a* of the individual second LED display 2 have a luminance decrease rate equivalent to the luminance decrease rate of the first LEDs 1*a* of the first LED display 1. This means that the luminance decrease rate of the second LEDs 2*a* is equal to the luminance decrease rate of the first LEDs 1*a* or is close enough to be equated to the luminance decrease rate of the first LEDs 1*a*. If the first LEDs 1*a* and the second LEDs 2*a* are LEDs of the same production lot or they have the same BIN code for classifying LEDs in accordance with, for example, the luminance and the wavelength, the characteristics of the first LEDs 1*a* such as the luminance and the wavelength agree with the characteristics of the second LEDs 2*a*. Consequently, the luminance decrease rate of the first LEDs 1*a* and the luminance decrease rate of the second LEDs 2*a* become equivalent.

Similarly to the individual first LED 1*a*, the individual second LED 2 is an LED in R, an LED in G, or an LED B. The plurality of second LEDs 2*a* in the individual second LED display 2 are composed of LEDs in R, LEDs in G, and LEDs in B. In an example illustrated in FIG. 7A, a two by two array of sets of the second LEDs 2*a*, or equivalently, four sets of the second LEDs 2*a* in total are arranged in matrix. Similarly to each set of the first LEDs 1*a*, each set of the second LEDs 2*a* includes three LEDs, namely, an LED in R, an LED in G, and an LED in B. The number of the second LEDs 2*a* is not limited to three.

In the third preferred embodiment, the first LED display 1 and each of the second LED displays 2 concurrently perform display (driving). Thus, the first LEDs 1*a* and the second LEDs 2*a* flash in similar environments, so that the difference in the luminance decrease rate between the first LEDs 1 and the second LEDs 2*a* can be reduced.

The signal creating unit 8 creates signals for creating a plurality of second drive signal.

The second driver 9 creates, in accordance with the signals created by the signal creating unit 8, a plurality of second drive signals for driving the plurality of second LED displays 2. The second driver 9 outputs the plurality of second drive signals to the plurality of second LED displays 2, so that the plurality of second LED displays 2 are driven.

The luminance meter 10 measures the luminances of the second LEDs 2*a* for each of the second LED displays 2. The luminance meter 10 in this preferred embodiment includes luminance meters 1001, 1002, 1003, and 1004 located corresponding one-to-one to the second LED displays 201, 202, 203, and 204. Alternatively, the luminance meter 10 may be, for example, a movable luminance meter.

The luminance decrease rate storage 11, namely, the luminance transition storage correlates and stores, for each of the second LED displays 2, the luminance decrease rate of the second LEDs 2*a* measured by the luminance meter 10 and the second cumulative lighting period of the second LEDs 2*a* (the period being the cumulative sum of the lighting periods of the second LEDs 2*a*). The luminance meter 10 performs measurement and the luminance decrease rate storage 11 performs storing as the need arises while the plurality of second LED displays 2 perform display.

The correction factor computing unit 12 computes luminance correction factors in accordance with the first cumulative lighting period stored in the lighting period storage 7 and with the luminance decrease rate and the second cumulative lighting period of the second LEDs 2*a* for each of the second LED displays 2 both stored in the luminance decrease rate storage 11.

The signal corrector 5 and the correction factor computing unit 12 mentioned above are included in the luminance corrector 18 in FIG. 7A. This means that the luminance corrector 18 computes the above-mentioned correction factors in accordance with the first cumulative lighting period stored in the lighting period storage 7 and with the luminance decrease rate and the second cumulative lighting period of the second LEDs 2*a* for each of the second LED displays 2 both stored in the luminance decrease rate storage 11. The luminance corrector 18 corrects the luminance of the signal output from the video signal processor 4 using the correction factors, and thus corrects the first drive signal (drive signal) to be output from the first driver 6 and corrects the luminances of the first LEDs 1*a* accordingly.

In the third preferred embodiment, the individual first LEDs 1*a* have different first cumulative lighting periods. The luminance corrector 18 is configured to correct the luminances of the first LEDs in accordance with the longest first cumulative lighting period among the first cumulative lighting periods stored in the lighting period storage 7 and with the luminance decrease rate and the second cumulative lighting period of the second LEDs 2*a* for each of the second LED displays 2 both stored in the luminance decrease rate storage 11.

<Details>

In the third preferred embodiment, the luminances of the first LEDs 1*a* are adjusted in accordance with the PWM method using the duty ratio described in the first preferred embodiment. The output signal corrected by the signal corrector 5 includes information on the duty ratio of the first drive signal to be output from the first driver 6 in the third preferred embodiment. The lighting period storage 7 accumulates the lighting periods of the individual first LEDs 1*a* per fixed unit time in accordance with the duty ratio included in the output signal, and stores the first cumulative lighting period of the individual first LEDs 1*a* accordingly. Assuming that the unit time is one hour and the duty ratio is 10%, 0.1 hour of lighting period (the period obtained by deducting the lights-out period from the flashing period) is added to the first cumulative lighting period in the lighting period storage 7 once every hour. The first cumulative lighting period corresponds to the first drive signal. Similarly, the second cumulative lighting period corresponds to the second drive signal.

The luminance of the first LED 1*a* in red (R) and the luminance of the first LED 1*a* in blue (B) decrease with increasing lighting period as described with reference to FIG. 3 in the first preferred embodiment.

According to the related art, the luminance decrease rate of the first LED 1*a* is determined by measuring the actual luminance in advance. In the third preferred embodiment, meanwhile, the first lighting period is measured in place of the actual luminance of the first LED 1*a*, and then the luminance decrease rate of the second LED 2*a* corresponding to the second lighting period which is substantially the same as the first lighting period is measured (predicted) as the luminance decrease rate of the first LED 1*a*. The measurement of (prediction on) the luminance decrease rate of the first LED 1*a* will be described below.

The signal creating unit 8 creates signals which are to become the second drive signals for controlling display performed by the plurality of second LED displays 2. The second driver 9 drives the plurality of second LED displays 2 in accordance with the signals created by the signal creating unit 8.

The signal creating unit 8 creates signals for driving (setting) the second LED displays 201, 202, 203, and 204 at duty ratios of 100%, 75%, 50%, and 25%, with 100% representing the maximum duty ratio of the first drive signal (PWM signal) for driving the first LED display 1.

Each of the luminance meters 10 is opposed to the corresponding one of the second LED displays 2 and measures the luminances of the second LEDs 2*a*. In the third preferred embodiment, the individual luminance meter 10 measures the luminance of each color of the second LEDs 2*a*.

Figure 8:
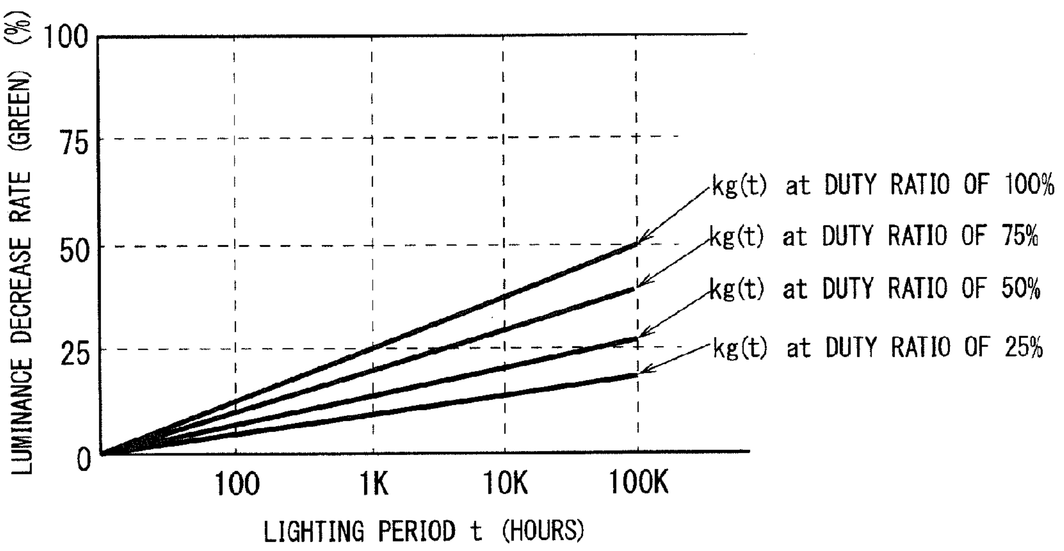
FIG. 8 is a graph illustrating an example of the relation between the lighting period and the luminance decrease rate of the second LEDs.

FIG. 8 is a graph illustrating an example of the relation between the lighting period (the second cumulative lighting period) being the elapsed time and the luminance decrease rates of the second LEDs 2*a* in green (G) that are driven at duty ratios of 100%, 75%, 50%, and 25%. A logarithmic scale is used to indicate the lighting period in FIG. 8.

Similarly to the luminances of the first LEDs 1, the luminances of the second LEDs 2*a* in green (G) decrease with increasing lighting period. As illustrated in FIG. 8, the luminance decrease rate of the LEDs increases with increasing lighting period. The luminance decrease rate increases to different degrees at different duty ratios. Similarly, the luminance decrease rate of the second LEDs 2*a* in red (R) and the luminance decrease rate of the second LEDs 2*a* in blue (B), to one degree or another, increase to different degrees at different duty ratios (not shown).

The luminance decrease rates of the second LEDs 2*a* in RGB colors are represented by kr(t), kg(t), and kb(t), which are the factors of the lighting period t. These factors kr(t), kg(t), and kb(t) can be computed as relational expressions such as approximation formulas or interpolation formulas by, for example, regression analysis of the luminance decrease rates and the second cumulative lighting periods of the plurality of set of the second LEDs 2*a* both stored in the luminance decrease rate storage 11.

The second LED display 201 is driven at a duty ratio of 100%, which is equal to or higher than the duty ratio at which the first LED display 1 is driven. This means that the first cumulative lighting period of the first LED display 1 is equal to or shorter than the second cumulative lighting period of the second LED display 201, with the cumulative lighting period being the cumulative sum of periods obtained by multiplying the period that has elapsed since the start of the use of the display by the duty ratio.

With t representing the lighting period of the second LED display 201 driven at a duty ratio of 100%, the lighting period of the second LED display 202 driven at a duty ratio of 75% is 0.75 t, the lighting period of the second LED display 203 driven at a duty ratio of 50% is 0.5 t, and the lighting period of the second LED display 204 driven at a duty ratio of 25% is 0.25 t.

The luminance decrease rate storage 11 correlates and stores the lighting periods of the second LEDs 2*a* and the measurement results on the second LED displays 201, 202, 203, and 204 obtained by the luminance meters 1001, 1002, 1003, and 1004.

Figure 9:
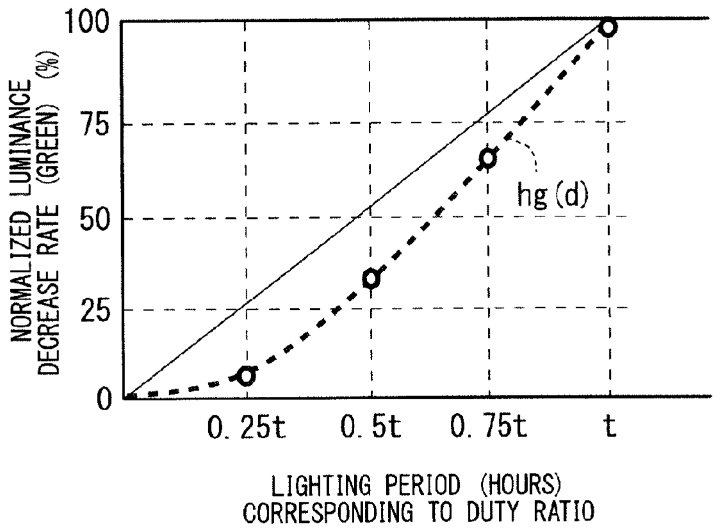
FIG. 9 is a graph illustrating an example of the relation between the lighting period and the luminance decrease rate of the second LED.

FIG. 9 is a graph illustrating an example of the relation between the lighting period t and the normalized luminance decrease rate of the second LEDs 2*a* in green (G) included in the second LED displays 201, 202, 203, and 204. The luminance decrease rate indicated by the vertical axis of FIG. 9 is normalized by the luminance decrease rate of the second LED display 201 corresponding to the lighting period (t) (at a duty ratio of 100%). A logarithmic scale is used to indicate the lighting period in FIG. 9.

In general, if the display is driven at a greater duty ratio, the display is lighted for a longer period and has a greater luminance decrease rate accordingly. The lighting period (duty ratio) and the heating value of an LED are not in a proportional relationship, and thus the lighting period (duty ratio) and the luminance decrease rate are not in a proportional relationship. As illustrated in FIG. 9, the actual luminance decrease rate is, in general, smaller than the luminance decrease rate given by the proportion. The same holds true for the luminance decrease rate of the second LEDs 2*a* in red (R) and the luminance decrease rate of the second LEDs 2*a* in blue (B) (not shown).

The luminance corrector 18 computes the function with respect to (the relational expression between) the luminance decrease rate and the second cumulative lighting period of the second LEDs 2*a* in accordance with the luminance decrease rate and the second cumulative light period of the second LEDs 2*a* for each of the second LED displays 2. For example, in the third preferred embodiment, the luminance corrector 18 computes a function hg(d) representing the relation between the duty ratio and the normalized luminance decrease rate of the second LEDs 2*a* in green (G). Similarly, the luminance corrector 18 computes functions hr(d) and hb(d) for the LEDs in red (R) and the LEDs in blue (B) as with the function hg(d). The functions hr(d), hg(d), and hb(d) can be computed as approximation formulas or interpolation formulas by, for example, regression analysis of the luminance decrease rates and the second cumulative lighting period of the LEDs 2*a* both stored in the luminance decrease rate storage 11. The functions hr(d), hg(d), and hb(d) may be, for example, approximation formulas being polynomials, which are not limited thereto.

The luminance corrector 18 obtains the luminance decrease rate of the first LEDs 1*a* by substituting the first cumulative lighting period stored in the lighting period storage 7 into the computed functions, and then corrects the first drive signal in accordance with the luminance decrease rate.

<Operation>

Figure 10:
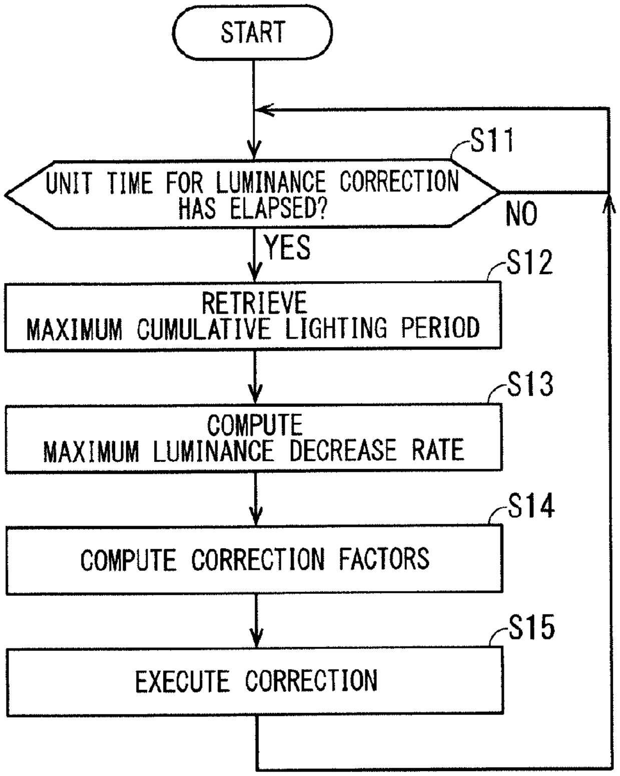
FIG. 10 is a flowchart illustrating the operation of the LED display apparatus according to the third preferred embodiment.

FIG. 10 is a flowchart illustrating the luminance correction operation performed by the LED display apparatus 100 according to the third preferred embodiment.

Firstly, in Step S11, the luminance corrector 18 (the signal corrector 5 and the correction factor computing unit 12) determines whether the unit time (for example, 100 hours) for the luminance correction has elapsed since the operation was started or since the previous correction was performed. The unit time for the luminance correction may be fixed or may be varied depending on the number of corrections (may be represented by an exponential function of the number of corrections). If the luminance corrector 18 determines that the unit time for the luminance correction has elapsed, the processing proceeds to Step S12. If not, the Step S11 is executed again.

In Step S12, the luminance corrector 18 makes reference to the lighting period storage 7 to retrieve the maximum cumulative lighting periods trmax, tgmax, and tbmax of the first LEDs 1*a* in RGB colors.

In Step S13, the luminance corrector 18 computes the maximum drive duty ratios denoted by drmax, dgmax, and dbmax using the maximum cumulative lighting periods trmax, tgmax, and tbmax retrieved in Step S12. With the first cumulative lighting periods of the first LEDs 1*a* in RGB colors being denoted by tr, tg, and tb, the drive duty ratios are represented by tr/t, tg/t, and tb/t. The maximum drive duty ratios drmax, dgmax, and dbmax for the first LEDs 1*a* in RGB colors are given by Expression (7) as below.

$$\left.\begin{aligned} dr\max &= \frac{tr\max}{t} \\ dg\max &= \frac{tg\max}{t} \\ db\max &= \frac{tb\max}{t} \end{aligned}\right\} \tag{7}$$

Then, the luminance corrector 18 retrieves the luminance decrease rates kr(t), kg(t), and kb(t) of RGB colors corresponding to the second cumulative lighting periods of the second LED display 201 (driven at a duty ratio of 100%) that are equal to or close to the maximum cumulative lighting periods trmax, tgmax, and tbmax retrieved in Step S12. The luminance corrector 18 computes the greatest luminance decrease rate, namely, a maximum luminance decrease rate krgb(dmax) using the retrieved luminance decrease rates kr(t), kg(t), and kb(t) and the above-mentioned functions hr(d), hg(d), and hb(d). This means that the luminance corrector 18 computes the maximum luminance decrease rate krgb(dmax) given by Expression (8) as below.

$$krgb(d\max)=\mathrm{MAX}(kr(t)\times hr(dr\max),kg(t)\times hg(dg\max),kb(t)\times hb(db\max)) \tag{8}$$

In Step S14, the luminance corrector 18 makes reference to the lighting period storage 7 and the luminance decrease rate storage 11 and computes a correction factor for each of the first LEDs 1*a* included in the first LED display 1 in accordance with the theoretical luminance decrease rate corresponding to the cumulative lighting period t and with the maximum luminance decrease rate krgb(dmax) computed in Step S13.

The corrected luminances Rcomp, Gcomp, and Bcomp of the first LEDs 1*a* in RGB colors are given by Expression (9), with the current theoretical luminances of the first LEDs 1*a* in RGB colors being denoted by Rp, Gp, and Bp, the theoretical luminance decrease rates of the first LEDs 1*a* in RGB colors corresponding to the cumulative lighting period t being represented by kr(t)×hr(tr/t), kg(t)×hg(tg/t), and kb(t)×hb(tb/t), and the maximum luminance decrease rate being represented by krgb(dmax). The luminance decrease rates kr(t)×hr(tr/t), kg(t)×hg(tg/t), and kb(t)×hb(tb/t) of RGB colors corresponding to the cumulative lighting period t are, for example, the maximum luminance decrease rates computed in the previous correction.

$$\left.\begin{aligned} Rcomp &= Rp\times\frac{1}{1-kr(t)\times hr\left(\frac{tr}{t}\right)}\times(1-krgb(d\max))\\ Gcomp &= Gp\times\frac{1}{1-kg(t)\times hg\left(\frac{tg}{t}\right)}\times(1-krgb(d\max))\\ Bcomp &= Bp\times\frac{1}{1-kb(t)\times hb\left(\frac{tb}{t}\right)}\times(1-krgb(d\max)) \end{aligned}\right\} \quad (9)$$

The luminance corrector 18 in the third preferred embodiment uses, as expressions representing the correction factors to be obtained in Step S14, expressions obtained by substituting 1 into Rp, Gp, and Bp on the right side of Expression (9).

With the initial luminances of the first LEDs 1*a* in RGB colors being denoted by R0, G0, and B0, the current theoretical luminances Rp, Gp, and BP in Expression (9) are given by Expression (10) as below.

$$\left.\begin{aligned} Rp &= R0\times\left(1-kr(t)\times hr\left(\frac{tr}{t}\right)\right)\\ Gp &= G0\times\left(1-kg(t)\times hg\left(\frac{tg}{t}\right)\right)\\ Bp &= B0\times\left(1-kb(t)\times hb\left(\frac{tb}{t}\right)\right) \end{aligned}\right\} \quad (10)$$

Substituting Expression (10) into Expression (9) yields Expression (11) representing the corrected luminances Rcomp, Gcomp, and Bcomp of the first LEDs 1*a* in RGB colors. As given by Expression (11), the luminances Rcomp, Gcomp, and Bcomp are obtained by correcting the initial luminances R0, G0, and B0 of the first LEDs 1*a* in RGB colors uniformly with the maximum luminance decrease rate krgb(dmax).

$$\left.\begin{aligned} Rcomp &= R0\times(1-krgb(d\max))\\ Gcomp &= G0\times(1-krgb(d\max))\\ Bcomp &= B0\times(1-krgb(d\max)) \end{aligned}\right\} \quad (11)$$

Subsequent to Step S14, the luminance corrector 18 corrects, in Step S15, the luminance of the signal output from the video signal processor 4, or equivalently, virtually corrects the first drive signal using the correction factors computed in Step S14, so that the luminances of the first LEDs 1*a* are corrected. Then, the processing returns to Step S11.

Similarly to the above-mentioned luminance adjustment, the luminance correction is performed by changing the duty ratio of the pulse width in Step S15. If krgb(dmax)=0.2 and kr(t)×hr(tr/t)=0.1, the expression representing the correction factor (the expression obtained by substituting 1 into Rp, Gp, or Bp on the right side of Expression (9) mentioned above) gives (1−0.2)/(1−0.1)=8/9 as the correction factor for the luminance Rp. The luminance corrector 18 multiplies the duty ratio of the pulse width by 8/9 to correct the luminance of the first LED 1*a*.

<Conclusion of Third Preferred Embodiment>

In the LED display apparatus 100 according to third preferred embodiment in which above-mentioned correction is performed, the luminances of all of the first LEDs 1*a* can be uniformly adjusted to be equal to the luminance of the LED having the longest lighting period (the luminance of the LED having the greatest luminance decrease rate) although the overall luminance of the first LED display 1 after the correction is lower than the overall luminance of the first LED display 1 before the correction. The luminance consistency and the white balance can be kept in the first LED display 1 as a whole, and variations in luminance and color can be eliminated or reduced accordingly.

In general, the heating value of an LED increases with increasing power consumption, and the LED has a greater luminance decrease rate accordingly. Conversely, the heating value of an LED decreases with decreasing power consumption, and the LED has a smaller luminance decrease rate accordingly. The luminance decrease rate of an LED cannot be predicted accurately if the duty ratio is fixed for the computation of the luminance decrease rate of the LED. In the LED display apparatus 100 according to the third preferred embodiment, meanwhile, the second LED displays 201, 202, 203, and 204 are driven by different drive signals (driven at different duty ratios), and the luminance decrease rate storage 11 stores the luminance decrease rates and the second cumulative lighting periods of the individual displays, thus making it possible to compute the difference in luminance decrease rate caused by the difference in heating value corresponding to the individual drive signal (duty ratio). This means that the luminance decrease rate of the first LED display 1 can be measured (predicted) accurately even if the first LED display 1 is driven by a drive signal (at a duty ratio) different from the drive signals (duty ratios) for driving the second LED displays 2. The luminance can be corrected with a higher degree of accuracy accordingly.

According to the related art, the luminance decrease rate of the first LED display 1 cannot be measured while a desired image is kept displayed on the first LED display 1. Thus, the related art fails to eliminate or reduce variations in luminance and color. According to the third preferred embodiment, meanwhile, with the desired image being kept displayed on the first LED display 1, the actual luminance decrease rates of the second LED displays 2, which are not the first LED display 1, are measured, so that the luminance decrease rate of the first LED display 1 can be virtually measured. Consequently, variations in luminance and color can be eliminated or reduced. This is expected to reduce the need for replacement with a new LED module.

<Modification>

In the third preferred embodiment, the individual second LED display 2 includes a plurality of sets (a two by two array of sets, or equivalently, four sets in FIG. 7A) of the second LEDs 2*a*. It is not always required that the individual second LED display 2 include a plurality of sets of the second LEDs 2*a*. Alternatively, the individual second LED display 2 may include one set of the second LEDs 2*a*. Unlike the configuration including one set of the second LEDs 2*a*, the configuration including a plurality of sets of the second LEDs 2*a* can provide the mean value of luminance per color, thus eliminating or reducing the adverse effects attributable to variations in luminance.

In the third preferred embodiment, the plurality of second LED displays 2 include four second LED displays 2 (the second LED displays 201, 202, 203, and 204) driven by four different drive signals, which are not limited thereto. It is only required that the plurality of second LED displays 2 include at least two second LED displays driven by at least two drive signals.

In the third preferred embodiment, the luminance corrector 18 computes the functions hr(d), hg(d), hb(d) with respect to the luminance decrease rate and the second cumulative lighting period of the second LEDs 2*a* in accordance with the luminance decrease rate and the second cumulative lighting period of the second LEDs 2*a* for each of the second LED displays 2. Then, the luminance corrector 18 corrects the first drive signal in accordance with the luminance decrease rates obtained by substituting the first cumulative lighting period stored in the lighting period storage 7 into the functions.

Alternatively, the luminance corrector 18 may acquire, on the basis of the luminance decrease rate and the second cumulative lighting period of the second LEDs 2*a* for each of the second LED displays 2, the luminance decrease rate of the second LEDs 2*a* corresponding to the second cumulative lighting period closest to the first cumulative lighting period stored in the lighting period storage 7.

If the duty ratio corresponding to the first cumulative lighting period is equal to or greater than 85% and is equal to or smaller than 100%, the luminance corrector 18 acquires the luminance decrease rate corresponding to the second cumulative lighting period of the second LED display 201 (driven at a duty ratio of 100%). If the duty ratio corresponding to the first cumulative light period is equal to or greater than 60% and is smaller than 85%, the luminance corrector 18 acquires the luminance decrease rate corresponding to the second cumulative lighting period of the second LED display 201 (driven at a duty ratio of 75%). If the duty ratio corresponding to the first cumulative lighting period is equal to or greater than 35% and is smaller than 60%, the luminance corrector 18 acquires the luminance decrease rate corresponding to the second cumulative lighting period of the second LED display 201 (driven at a duty ratio of 50%). If the duty ratio corresponding to the first cumulative lighting period is smaller than 35%, the luminance corrector 18 acquires the luminance decrease rate corresponding to the second cumulative lighting period of the second LED display 201 (driven at a duty ratio of 25%).

The luminance corrector 18 may correct the first drive signal in accordance with the acquired luminance decrease rate. The luminance can be corrected with a higher degree of accuracy in this configuration as in the third preferred embodiment.

The above-mentioned modifications are also applicable to a fourth preferred embodiment, which will be described below.

Fourth Preferred Embodiment

An LED display apparatus according to the fourth preferred embodiment of the present invention has the same block configuration as that of the LED display apparatus according to the third preferred embodiment (see FIGS. 7A and 7B). The constituent components of the LED display apparatus according to the fourth preferred embodiment that are identical to or similar to the constituent components of the LED display apparatus according to the third preferred embodiment are denoted by the same reference signs. The following description will be mainly given on the distinctive constituent components.

The LED display apparatus 100 according to the third preferred embodiment perform luminance correction in such a manner that the luminances of the individual first LEDs 1*a* included in the first LED display 1 are uniformly adjusted to be equal to the luminance of the first LED 1*a* having the greatest luminance decrease rate assuming that the initial luminances of the first LEDs 1*a* are set at the maximum luminance.

In the LED display apparatus 100 according to the fourth preferred embodiment, the initial luminances of the first LEDs 1*a* are set at a luminance lower than the maximum luminance of the first LEDs 1*a* (for example, a luminance equivalent to 50% of the maximum luminance). The luminance corrector 18 in this configuration can perform luminance correction in such a manner that the luminances of the individual first LEDs 1*a* included in the first LED display 1 are uniformly adjusted to be equal to the luminance of the first LED 1*a* having the smallest luminance decrease rate. Thus, the luminance corrector 18 can make the correction such that the luminances of the first LEDs 1*a* are adjusted to (maintained at) the fixed initial luminance.

To be more specific, the corrected luminances Rcomp, Gcomp, and Bcomp of the first LEDs 1*a* in RGB colors are given by Expression (12) as below, with the current theoretical luminances of the first LEDs 1*a* in RGB colors being denoted by Rp, Gp, and Bp and the theoretical luminance decrease rates of RGB colors corresponding to the cumulative lighting period t being represented by kr(t)×hr(tr/t), kg(t)×hg(tg/t), and kb(t)×hb(tb/t).

$$\left.\begin{aligned} Rcomp &= Rp \times \frac{1}{1 - kr(t) \times hr\left(\frac{tr}{t}\right)} \\ Gcomp &= Gp \times \frac{1}{1 - kg(t) \times hg\left(\frac{tg}{t}\right)} \\ Bcomp &= Bp \times \frac{1}{1 - kb(t) \times hb\left(\frac{tb}{t}\right)} \end{aligned}\right\} \quad (12)$$

Substituting Expression (10) into Expression (12) yields Expression (13) representing the corrected luminances Rcomp, Gcomp, and Bcomp of the first LEDs 1*a* in RGB colors. As given by Expression (13), the corrected luminances Rcomp, Gcomp, and Bcomp of the first LEDs 1*a* in RGB colors become equal to the initial luminances R0, G0, and B0 of the first LEDs 1*a* in RGB colors.

$$\left.\begin{aligned} Rcomp &= R0 \\ Gcomp &= G0 \\ Bcomp &= B0 \end{aligned}\right\} \quad (13)$$

<Conclusion of Fourth Preferred Embodiment>

Although the initial luminances are low, the fourth preferred embodiment has an advantage in the constant luminances before and after the correction. The luminances of the first LEDs 1*a* can be corrected by changing the duty ratio of the pulse width as in the third preferred embodiment. As described above, the luminances of the first LEDs 1*a* that have undergone the luminance decrease are corrected to be equal to the initial luminance, so that the luminances of all of the first LEDs 1*a* can be adjusted to be equal to the initial luminance. Even if the luminances the first LEDs 1*a* decrease over time, the luminance of the first LED display 1 can be kept constant.

The above-mentioned control for keeping the luminances constant may be applied to the configuration capable of providing a multiscreen display through the use of a plurality of LED panels such that the luminances of the individual LED panels can be kept constant. The luminance of the multiscreen as a whole can be kept constant as in the above description accordingly.

As described above, the output from the video signal processor 4 undergoes the luminance correction for the first LEDs 1*a*. It is only required that the duty ratio of the first drive signal for the first LEDs 1*a*, the drive current, or the driving of the first LED display 1 be corrected in the processing, and thus the target of the luminance correction is not limited to the output from the video signal processor 4.

Fifth Preferred Embodiment

An LED display apparatus according to the fifth preferred embodiment of the present invention has the same block configuration as that of the LED display apparatus according to the first preferred embodiment (see FIGS. 1A and 1B). The hardware of the individual constituent component is similar to the hardware in FIG. 2 described in the first preferred embodiment. The constituent components of the LED display apparatus according to the fifth preferred embodiment that are identical to or similar to the constituent components of the LED display apparatus according to the first preferred embodiment are denoted by the same reference signs. The following description will be mainly given on the distinctive constituent components.

The following describes the outline of the individual constituent components of the LED display apparatus 100 according to the fifth preferred embodiment. For the sake of convenience, FIG. 1A illustrates the first LED display 1 and the second LED display 2 as separate members. In the fifth preferred embodiment, the first LED display 1 and the second LED display 2 are integrally formed as will be described below.

<Outline>

Figure 11:
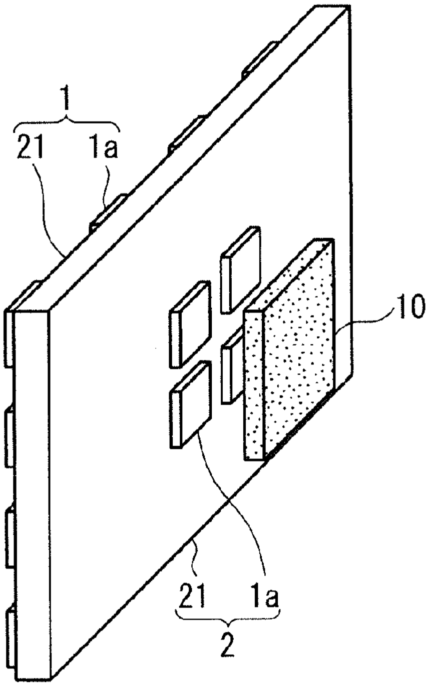
FIG. 11 is a perspective view of a configuration of a first display and a configuration of a second display according to a fifth preferred embodiment.

FIG. 11 is a perspective view of a configuration of the first LED display 1 and a configuration of the second LED display 2. As illustrated in FIG. 11, the first LED display 1 and the second LED display 2 share a substrate 21. The plurality of first LEDs 1*a* of the first LED display 1 are located on a first main surface of the substrate 21. The plurality of second LEDs 2*a* of the second LED display 2 are concentratedly disposed (mounted) on part of a second main surface opposite to the first main surface of the substrate 21 and are thermally coupled to the plurality of first LEDs 1*a* with the substrate 21 therebetween accordingly. Thus, the first LEDs 1*a* and the second LEDs 2*a* flash in similar environments, so that the difference in the luminance decrease rate between the first LEDs 1*a* and the second LEDs 2*a* can be reduced.

In the fifth preferred embodiment, the first LED display 1 and the second LED display 2 concurrently perform display (driving). Thus, the first LEDs 1*a* and the second LEDs 2*a* flash in similar environments, so that the difference in the luminance decrease rate between the first LEDs 1*a* and the second LEDs 2*a* can be reduced.

In the fifth preferred embodiment, the luminance meter 10 is opposed to the second LED display 2 (see FIG. 11) and measures the luminances of the second LEDs 2*a*. In the fifth preferred embodiment, the luminance meter 10 measures the luminance of each color of the second LEDs 2*a*.

The luminance correction operation performed by the LED display apparatus 100 according to the fifth preferred embodiment is similar to the luminance correction operation performed by the LED display apparatus 100 in the first preferred embodiment (see FIG. 5), and thus the description thereof is omitted.

<Conclusion of Fifth Preferred Embodiment>

In the LED display apparatus 100 according to the fifth preferred embodiment in which above-mentioned correction is performed, the luminances of all of the first LEDs 1*a* can be uniformly adjusted to be equal to the luminance of the LED having the longest lighting period (the luminance of the LED having the greatest luminance decrease rate) although the overall luminance of the first LED display 1 after the correction is lower than the overall luminance of the first LED display 1 before the correction. The luminance consistency and the white balance can be kept in the first LED display 1 as a whole, and variations in luminance and color can be eliminated or reduced accordingly.

The luminance decrease of an LED is dependent not only on time but also on temperature. The thermal coupling between the first LEDs 1*a* and the second LEDs 2*a* in the fifth preferred embodiment can reduce a temperature difference between the first LED display 1 for use in displaying and the second LED display 2 for use in measuring luminances. This can accurately reduce the difference in the luminance decrease rate between the first LED display 1 and the second LED display 2, and the luminance can be corrected with a higher degree of accuracy.

In the fifth preferred embodiment, the second LED display 2 is driven at a duty ratio equivalent to the maximum duty ratio of the first LED display 1. Consequently, the second cumulative lighting period of the second LEDs 2*a* is equal to or longer than the first cumulative lighting period of the first LEDs 1*a*, and thus, the luminances of the second LEDs 2*a* decrease at a pace equal to or faster than the pace at which the luminances of the first LEDs 1*a* decrease. This means that the luminance decrease rate storage 11 stores the luminance decrease rate of the second LED 2*a* having the longest lighting period as the future luminance decrease rate of the first LEDs 1. In the fifth preferred embodiment, the luminance decrease rate of the first LEDs 1*a* is predicted in accordance with the luminance decrease rate of the second LEDs 2*a* stored in the luminance decrease rate storage 11. Thus, the luminance decrease rate of the first LEDs 1*a* can be predicted with a higher degree of accuracy, and the luminance can be corrected with a higher degree of accuracy accordingly.

According to the related art, the luminance decrease rate of the first LED display 1 cannot be measured while a desired image is kept displayed on the first LED display 1. Thus, the related art fails to eliminate or reduce variations in luminance and color. According to the fifth preferred embodiment, meanwhile, with the desired image being kept displayed on the first LED display 1, the actual luminance decrease rate of the second LED display 2, which is not the first LED display 1, is measured, so that the luminance decrease rate of the first LED display 1 can be virtually measured. Consequently, variations in luminance and color can be eliminated or reduced. This is expected to reduce the need for replacement with a new LED module.

Sixth Preferred Embodiment

An LED display apparatus according to the sixth preferred embodiment of the present invention has the same block configuration as that of the LED display apparatus according to the first preferred embodiment (see FIGS. 1A and 1B). The constituent components of the LED display apparatus according to the sixth preferred embodiment that are identical to or similar to the constituent components of the LED display apparatus according to the fifth preferred embodiment are denoted by the same reference signs. The following description will be mainly given on the distinctive constituent components.

Figure 12:
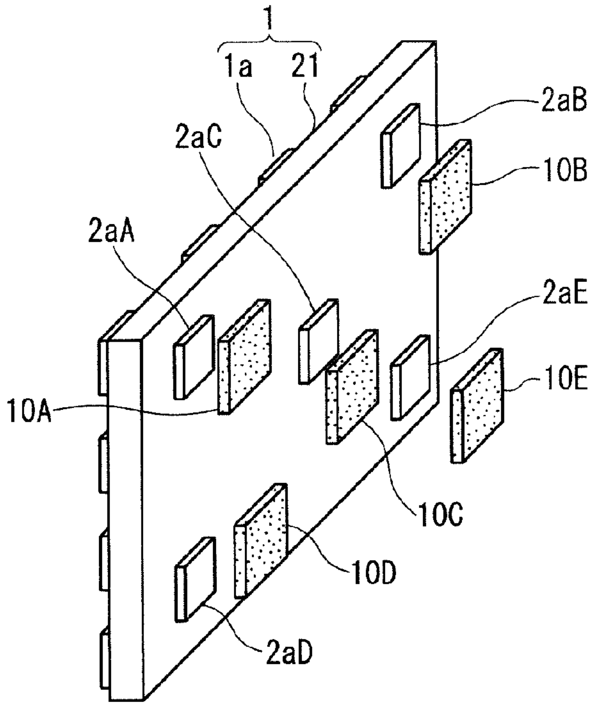
FIG. 12 is a perspective view of a configuration of the first LED and a configuration of the second LED according to a sixth preferred embodiment.

In the fifth preferred embodiment, the plurality of second LEDs 2*a* are concentratedly disposed (mounted) on part of the second main surface of the substrate 21 (see FIG. 11). In the sixth preferred embodiment, meanwhile, five sets of the second LEDs 2*a* (second LEDs 2*a*A, 2*a*B, 2*a*C, 2*a*D, and 2*a*E) are dispersedly located on the second main surface of the substrate 21 as illustrated in FIG. 12. Similarly to the plurality of sets of the second LEDs 2*a*, five luminance meters 10 (luminance meters 10A, 10B, 10C, 10D, and 10E) are also dispersedly located. In the sixth preferred embodiment with the above-mentioned configuration, the average luminance decrease can be acquired from the plurality of sets of the second LEDs 2*a* even if the temperature distribution in the substrate 21 is unbalanced. This can further improve the accuracy with which to predict the luminance decrease rate.

Figure 13:
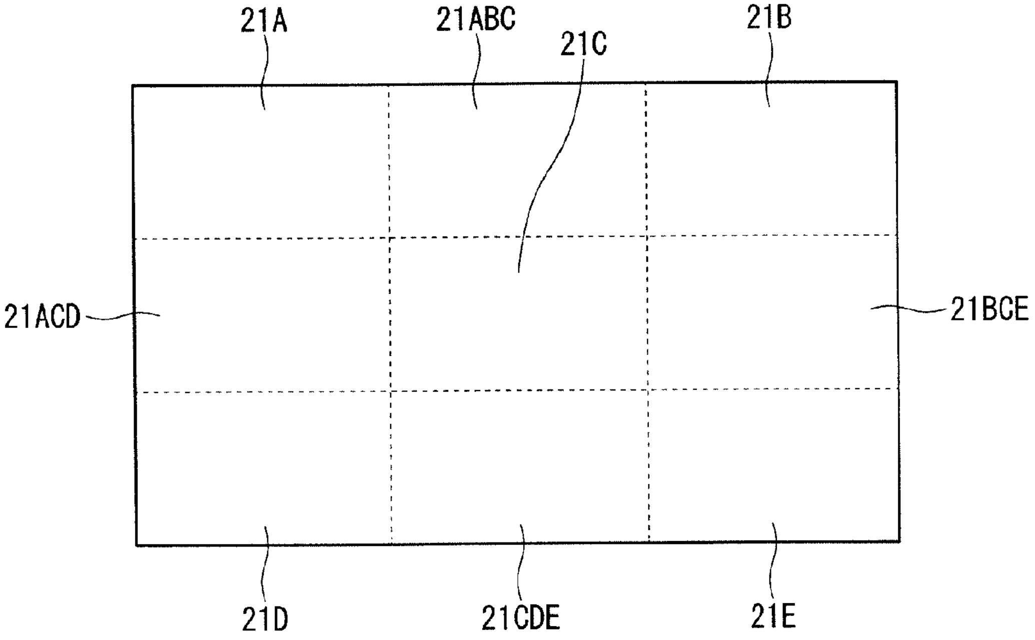
FIG. 13 is a diagram illustrating blocks into which a substrate shared by the first LED display and the second LED display according to the sixth preferred embodiment is divided.

In the sixth preferred embodiment, as illustrated in FIG. 13, the first main surface and the second main surface of the substrate 21 are divided (partitioned) into nine blocks (blocks 21A, 21B, 21C, 21D, 21E, 21ABC, 21ACD, 21BCE, and 21CDE), which are shared by the first and second main surfaces. Each of five sets of the second LEDs 2*a* (the second LEDs 2*a*A, 2*a*B, 2*a*C, 2*a*D, and 2*a*E) is located in the corresponding one of the blocks 21A, 21B, 21C, 21D, and 21E.

The lighting period storage 7 stores the first cumulative lighting periods of the individual sets of the first LEDs in the blocks 21A, 21B, 21C, 21D, and 21E on a block-by-block basis. The luminance meter 10 measures the luminances of the individual sets of the second LEDs 2*a* in the blocks 21A, 21B, 21C, 21D, and 21E on a block-by-block basis.

The luminance decrease rate storage 11 stores the luminance decrease rates and the second cumulative lighting periods of the individual sets of the second LEDs 2*a* in the block 21A, 21B, 21C, 21D, and 21E on a block-by-block basis. The luminance corrector 18 corrects the luminances of the first LEDs 1*a* by computing the luminance decrease rates per block in accordance with the first cumulative lighting period for corresponding blocks and with the luminance decrease rates and the second cumulative lighting periods for corresponding blocks.

The luminance corrector 18 in the sixth preferred embodiment will be described below in detail.

The luminance decrease rates of the first LEDs 1*a* in RGB colors in the block 21A are represented by functions of the lighting period t, namely, krA(t), kgA(t), and kbA(t). Similarly, the luminance decrease rates of the first LEDs 1*a* in RGB colors in the blocks 21B, 21C, 21C, 21D, and 21E are represented by functions of the lighting periods t, namely, krB(t), kgB(t), kbB(t), krC(t), kgC(t), kbC(t), krD(t), kgD(t), kbD(t), krE(t), kgE(t), and kbE(t).

The luminance corrector 18 computes k$ABC(t), k$ACD(t), k$BCE(t), and k$CDE(t) ($=r, g, b) being functions of the luminance decrease rates in the blocks 21ABC, 21ACD, 21BCD, and 21CDE, in which the second LEDs are absent, in accordance with the luminance decrease rates in the surrounding blocks and with Expression (14) as below.

$$\left.\begin{aligned} k\$ABC(t) &= \frac{k\$A(t)+k\$B(t)+k\$C(t)}{3} \\ k\$ACD(t) &= \frac{k\$A(t)+k\$C(t)+k\$D(t)}{3} \\ k\$BCE(t) &= \frac{k\$B(t)+k\$C(t)+k\$E(t)}{3} \\ k\$CDE(t) &= \frac{k\$C(t)+k\$D(t)+k\$E(t)}{3} \end{aligned}\right\} \quad (14)$$

$(\$ = r, g, b)$

The luminance corrector 18 makes reference to the lighting period storage 7 to retrieve the maximum cumulative lighting periods of the first LEDs 1*a* in RGB colors, which are represented by trmax#, tgmax#, and tbmax# (#=A, B, C, D, E, ABC, ACD, BCE, CDE), for each of the blocks 21A, 21B, 21C, 21D, 21E, 21ABC, 21ACD, 21BCE, and 21CDE.

The luminance corrector 18 acquires, from the luminance decrease rate storage 11, luminance decrease rates krAtrmax#), kgAtgmax#), and kbAtbmax#) of RGB colors corresponding to the maximum cumulative lighting periods trmax#, tgmax#, and tbmax#.

The luminance corrector 18 computes a maximum luminance decrease rate krgb#(tmax#) given by Expression (15) as below for each of the blocks 21A, 21B, 21C, 21D, 21E, 21ABC, 21ACD, 21BCE, and 21CDE in accordance with the acquired luminance decrease rates krAtrmax#), kgAtgmax#), and kbAtbmax#) of the first LEDs 1*a* in RGB colors.

$$krgb\#(t\max\#)=\mathrm{MAX}(kr\#(tr\max\#),kg\#(tg\max\#),kb\#(tb\max)) \quad (15)$$

(#=A, B, C, D, E, ABC, ACD, BCE, CDE)

The luminance corrector 18 computes the maximum luminance decrease rate of the first LEDs 1*a* included in the first LED display 1, namely, a maximum luminance decrease rate krgbALL for the entire blocks in accordance with Expression (16) as below.

$$krgb\mathrm{ALL}=\mathrm{MAX}(krgbA(t\max A),krgbB(t\max B),krgbC(t\max C),krgbD(t\max D),krgbE(t\max E),krgbABC(t\max ABC),krgbACD(t\max ACD),krgbBCE(t\max BCE),krgbCDE(t\max CDE)) \quad (16)$$

The corrected luminances Rcomp, Gcomp, and Bcomp of the first LEDs 1*a* in RGB colors are given by Expression (17) as below, with the current theoretical luminances of the first LEDs 1*a* in RGB colors being denoted by Rp, Gp, and Bp, the theoretical luminance decrease rates of the first LEDs 1*a* in RGB colors corresponding to the cumulative lighting period t being represented by kr#(t), kg#(t), and kb#(t), and the maximum luminance decrease rate being denoted by krgbALL. The theoretical luminance decrease rates kr#(t), kg#(t), and kb#(t) of RGB colors corresponding to the cumulative lighting period t are, for example, the maximum luminance decrease rates computed in the previous correction.

$$\left.\begin{aligned} Rcomp &= Rp \times \frac{1}{(1 - kr\#(t))} \times (1 - krgbALL) \\ Gcomp &= Gp \times \frac{1}{(1 - kg\#(t))} \times (1 - krgbALL) \\ Bcomp &= Bp \times \frac{1}{(1 - kb\#(t))} \times (1 - krgbALL) \end{aligned}\right\} \quad (17)$$

$$(\# = A, B, C, D, E, ABC, ACD, BCE, CDE)$$

The luminance corrector 18 in the sixth preferred embodiment uses, as expressions representing the correction factors, expressions obtained by substituting 1 into Rp, Gp, and Bp on the right side of Expression (17). Then, the luminance corrector 18 corrects the luminance of the signal output from the video signal processor 4, or equivalently, corrects the first drive signal using the obtained correction factors, so that the luminances of the first LEDs 1*a* are corrected.

<Conclusion of Sixth Preferred Embodiment>

The LED display apparatus 100 according to the sixth preferred embodiment described above measures (predicts) the luminances of the first LEDs 1*a* per block in accordance with the first cumulating lighting periods for corresponding blocks and with the luminance decrease rates and the second cumulative light periods for corresponding blocks. Thus, errors in the luminance decrease rates caused by the unbalanced temperature distribution in the substrate 21 can be corrected by, for example, averaging. This can reduce the difference in the luminance decrease rate between the first LED display 1 and the second LED display 2, and the luminance can be corrected with a higher degree of accuracy accordingly.

Although the substrate 21 is divided into nine blocks and five sets of the second LEDs 2*a* are located on the substrate 21 as described above, the number of blocks is not limited to nine and the number of sets of the second LEDs 2*a* is not limited to five. For example, the number of blocks may be increased, that is, the blocks may be subdivided, so that the luminances can be minutely corrected. In a case where the unbalanced temperature distribution in the substrate 21 is more complex, the additional second LEDs 2*a* can improve the accuracy with which to correct the luminance.

As described above, the output from the video signal processor 4 undergoes the luminance correction for the first LEDs 1*a*. It is only required that the duty ratio of the first drive signal for the first LEDs 1*a*, the drive current, or the driving of the first LED display 1 be corrected in the processing, and thus the target of the luminance correction is not limited to the output from the video signal processor 4.

In the present invention, the above preferred embodiments and the modifications thereof can be arbitrarily combined, or each preferred embodiment and each modification can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. An LED display apparatus comprising:
- a first LED display including a first LED;
- a second LED display including a second LED that undergoes luminance transitions equivalent to luminance transitions of said first LED;
- a lighting period storage to store a first cumulative lighting period of said first LED;
- a luminance meter to measure a luminance of said second LED;
- a luminance transition storage to correlate and store said luminance transitions of said second LED measured by said luminance meter and a second cumulative lighting period of said second LED; and
- a luminance corrector to correct a luminance of said first LED in accordance with said first cumulative lighting period stored in said lighting period storage and with said luminance transitions and said second cumulative lighting period of said second LED both stored in said luminance transition storage.

2. The LED display apparatus according to claim 1, wherein
- a plurality of said first cumulative lighting periods of a plurality of said first LEDs are different from each other, and
- said luminance corrector corrects luminances of said plurality of first LEDs in accordance with the longest first cumulative lighting period among said plurality of first cumulative lighting periods stored in said lighting period storage and with said luminance transitions and said second cumulative lighting period of said second LED both stored in said luminance transition storage.

3. The LED display apparatus according to claim 1, wherein
- said first LED display and said second LED display concurrently perform display.

4. The LED display apparatus according to claim 1, wherein
- said first LED display is driven in accordance with a drive signal, and
- said luminance corrector corrects a luminance of said first LED by computing a correction factor in accordance with said first cumulative lighting period stored in said lighting period storage and with said luminance transitions and said second cumulative lighting period of said second LED both stored in said luminance transition storage and by correcting said drive signal using said correction factor.

5. The LED display apparatus according to claim 1, comprising a plurality of said second LED displays, wherein
- said first LED display is driven in accordance with a first drive signal,
- said plurality of second LED displays are driven in accordance with a plurality of second drive signals that are different from each other,
- said lighting period storage stores said first cumulative lighting period corresponding to said first drive signal for said first LED,
- said luminance meter measures a luminance of said second LED for each of said plurality of second LED displays,
- said luminance transition storage correlates and stores, for each of said plurality of second LED displays, said luminance transitions of said second LED measured by said luminance meter and said second cumulative lighting period corresponding to one of said plurality of second drive signals for said second LED, and said luminance corrector corrects a luminance of said first LED by correcting said first drive signal in accordance with said first cumulative lighting period stored in said lighting period storage and with said luminance transitions and said second cumulative lighting period of said second LED for each of said plurality of second LED displays both stored in said luminance transition storage.

6. The LED display apparatus according to claim 5, wherein said luminance corrector acquires, on the basis of said luminance transitions and said second cumulative lighting period of said second LED for each of said plurality of second LED displays, said luminance transitions of said second LED corresponding to one of a plurality of said second cumulative lighting periods that is closest to said first cumulative lighting period stored in said lighting period storage, and said luminance corrector corrects said first drive signal in accordance with said acquired luminance transitions.

7. The LED display apparatus according to claim 5, wherein said first LED display and each of said plurality of second LED displays concurrently perform display.

8. The LED display apparatus according to claim 1, wherein said second LED is thermally coupled to said first LED.

9. The LED display apparatus according to claim 8, wherein said first LED display and said second LED display share a substrate, said first LED is located on a first main surface of said substrate, and said second LED is located on a second main surface opposite to said first main surface of said substrate so as to be thermally coupled to said first LED with said substrate located therebetween.

10. The LED display apparatus according to claim 9, wherein said first main surface and said second main surface are divided into a plurality of blocks shared by said first and second main surfaces, said lighting period storage stores a plurality of said first cumulative lighting periods of a plurality of said first LEDs per block, said luminance meter measures luminances of a plurality of said second LEDs per block, said luminance transition storage stores said luminance transitions and a plurality of said second cumulative lighting periods per block, and said luminance corrector corrects luminances of said plurality of first LEDs in accordance with said plurality of first cumulative lighting periods for corresponding blocks and with said luminance transitions and said plurality of second cumulative lighting periods for corresponding blocks.

11. The LED display apparatus according to claim 8, wherein said first LED display and said second LED display concurrently perform display.

* * * * *